United States Patent
Peng

(10) Patent No.: US 11,885,427 B1
(45) Date of Patent: Jan. 30, 2024

(54) VALVE CORE WITH BOLT-CONNECTED VALVE STEM AND DRIVE PIECE

(71) Applicant: KUCHING INTERNATIONAL LTD., Taichung (TW)

(72) Inventor: Hao-Nan Peng, Taichung (TW)

(*) Notice: Subject to any disclaimer, the term of this patent is extended or adjusted under 35 U.S.C. 154(b) by 0 days.

(21) Appl. No.: 18/153,455

(22) Filed: Jan. 12, 2023

(51) Int. Cl.
*F16K 3/314* (2006.01)
*F16K 3/08* (2006.01)
*F16K 3/02* (2006.01)

(52) U.S. Cl.
CPC .......... *F16K 3/314* (2013.01); *F16K 3/0254* (2013.01); *F16K 3/08* (2013.01)

(58) Field of Classification Search
CPC .......... F16K 3/314; F16K 3/0254; F16K 3/08; F16K 3/02; F16K 3/085; F16K 3/06; F16K 3/04; F16K 11/07; F16K 11/0743; F16K 11/076; F16K 11/0787; F16K 27/045; Y10T 137/9464; Y10T 137/86815; Y10T 137/86823; Y10T 137/86549
USPC ......... 251/206, 309; 137/625.41, 625.4, 801, 137/636.1, 625.17
See application file for complete search history.

(56) References Cited

U.S. PATENT DOCUMENTS

| | | | | |
|---|---|---|---|---|
| 5,417,242 A * | 5/1995 | Goncze | ............... | F16K 11/0787 137/625.4 |
| 6,289,531 B1 * | 9/2001 | Kahle | ...................... | E03C 1/04 4/678 |
| 8,490,653 B2 * | 7/2013 | Chen | .................... | F16K 11/0787 137/625.4 |
| 8,646,750 B1 * | 2/2014 | Chen | .................... | F16K 11/0782 137/625.15 |
| 9,228,675 B2 * | 1/2016 | Chen | ...................... | F16K 27/044 |
| 9,464,417 B2 * | 10/2016 | Chen | ....................... | E03C 1/041 |
| 10,598,290 B2 * | 3/2020 | Asboth | ............... | F16K 11/0787 |
| 10,724,216 B2 * | 7/2020 | Cattaneo | ............... | F16K 27/044 |
| 2006/0192166 A1 * | 8/2006 | Lange | ....................... | F16K 3/08 251/264 |
| 2014/0238517 A1 * | 8/2014 | Chen | ....................... | F16K 35/04 137/605 |
| 2017/0108127 A1 * | 4/2017 | Chang | ..................... | F16K 27/04 |
| 2019/0323615 A1 * | 10/2019 | Chen | .................... | F16K 11/0743 |
| 2019/0323616 A1 * | 10/2019 | Chen | ..................... | F16K 11/074 |

* cited by examiner

*Primary Examiner* — Craig J Price
*Assistant Examiner* — Andrew J Rost
(74) *Attorney, Agent, or Firm* — Egbert, McDaniel & Swartz, PLLC

(57) ABSTRACT

Disclosed is a valve core with bolt-connected valve stem and drive piece, including a valve shell, a valve stem, a drive piece, dynamic and static valve plates, and a valve seat. The drive piece valve plates are sequentially configured inside the valve shell. The valve seat is connected to the valve shell, and the static valve plate is connected to the valve seat. The valve plates are tightly overlapped. The drive piece is used to drive the dynamic valve plate to rotate, and is protruded with a hollow convex cap. The valve stem goes through the drive piece along the axial direction into the convex cap. A bolt piece goes through the valve stem and the convex cap along the radial direction, so that the valve stem and the drive piece are bolt-connected. A sealing piece is covered by the convex cap, and the sealing piece seals the bolt piece.

4 Claims, 5 Drawing Sheets

VALVE CORE WITH BOLT-CONNECTED VALVE STEM AND DRIVE PIECE

CROSS-REFERENCE TO RELATED U.S. APPLICATIONS Not applicable.

BACKGROUND OF THE INVENTION

1. Field of the Invention

The present invention relates generally to a fluid-controlling component, and more particularly to an innovative structural design of a valve core with bolt-connected valve stem and drive piece.

2. Description of Related Art Including Information Disclosed Under 37 CFR 1.97 and 37 CFR 1.98.

A valve core is a component configured in a pipeline or a fluid device to control the flow of the fluid. A conventional valve core normally comprises a valve shell, a valve stem, a drive piece, a dynamic valve plate, a static valve plate, and a valve seat. The drive piece, the dynamic valve plate, and the static valve plate are sequentially configured inside the valve shell along the axial direction. The valve seat is connected to the valve shell. The static valve plate is connected to the valve seat. The dynamic valve plate and the static valve plate are plates made of a ceramic material. The dynamic valve plate and tightly overlapped with the static valve plate. The dynamic valve plate is located between the drive piece and the static valve plate. The drive piece is configured with a plurality of convex parts along the axial direction. The side of the dynamic valve plate facing the drive piece is formed with a plurality of embedding notches, and each of the convex parts are respectively embedded into each of the notches.

The valve stem goes through the drive piece along the axial direction, and a bolt piece goes through the drive piece and the valve stem along the axial direction, so that the bolt piece can connect the valve stem and the drive piece. Through the bolt piece, the valve stem can cause the drive piece to rotate. The drive piece can drive the dynamic valve plate to rotate around the static valve plate, so as to control the flow of the fluid, and the bolt piece can limit the valve stem and the drive piece, preventing them to move in relation to each other along the axial direction.

However, in actual applications, such a structural design has the following problem: the configuration of the valve core in the pipeline or fluid device and the state of the valve stem to cause the drive piece to rotate will affect the state of the bolt piece inside the space, and the axial direction of the bolt piece is not always perpendicular to the direction of its gravity. As a result, the bolt piece may slide along the axial direction under the impact of its gravity. When the bolt piece slides and falls apart from the valve stem, the valve stem cannot cause the drive piece to rotate through the bolt piece. If the axial length of the bolt piece is increased and the valve shell is used to limit the distance of axial slide of the bolt piece, the bolt piece will not fall apart from the valve stem after the slide. However, when the valve stem causes the drive piece to rotate, the bolt piece will rotate along with the valve stem, the end of the bolt piece abutting the valve shell will have relative friction with the valve shell, causing noise and adverse impact to the strength and life cycle of the valve shell.

BRIEF SUMMARY OF THE INVENTION

The main object of the invention is to provide a valve core with a bolt-connected valve stem and drive piece. It aims to solve the above problem by making a technical breakthrough and developing a new, ideal and more practical structural design of a valve core.

Based on the above object, the present invention provides a valve core with bolt-connected valve stem and drive piece, which comprises a valve shell, a valve stem, a drive piece, a dynamic valve plate, a static valve plate, and a valve seat, wherein the valve shell is a hollow shell structure, the drive piece, the dynamic valve plate, and the static valve plate are sequentially configured inside the valve shell along the axial direction, the valve seat is connected to the valve shell, the static valve plate is connected to the valve seat, the dynamic valve plate and the static valve plate are respectively plates made of a ceramic material, the dynamic valve plate and the static valve plate are tightly overlapped, and the dynamic valve plate is located between the drive piece and the static valve plate. The drive piece is configured with a first convex part and a second convex part along the axial direction. The side of the dynamic valve plate facing the drive piece is formed with two notches. The first convex part and the second convex part are respectively embedded into each of the notches. The drive piece is protruded out of a hollow convex cap in the direction facing the dynamic valve plate. The valve stem goes through the axle center of the drive piece. One end of the valve stem is extends into the convex cap, and the other end of the valve stem extends out of the valve shell in the direction away from the valve seat. The valve stem is radially configured with a first bolt hole. The convex cap is radially configured with two second bolt holes, wherein the first bolt hole and the second bolt hole are sequentially configured along the axial direction and are communicated to each other. A bolt piece goes radially through the first bolt hole and each of the second bolt holes, so that the valve stem and the drive piece are bolt-connected.

A sealing piece is covered by the convex cap, and the sealing piece blocks the end of the second bolt hole away from the valve stem, thus sealing the bolt piece.

Based on the above innovative structural design and technical features, the present invention made an improvement to the prior art in that the sealing piece blocks the bolt piece while maintaining the connection between the valve stem and the drive piece. It is truly an inventive step.

DETAILED DESCRIPTION OF THE INVENTION

Figure 1:
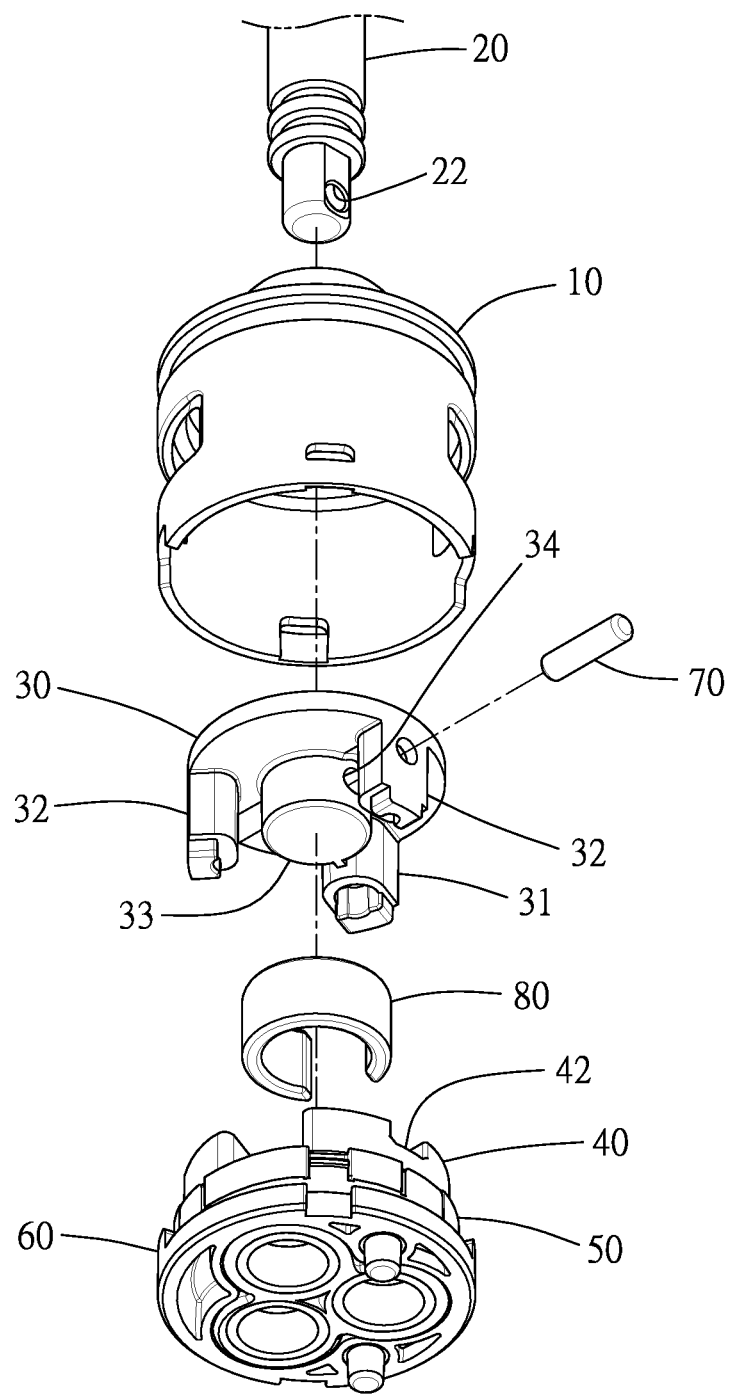
FIG. 1 is an exploded perspective view of Embodiment 1 of the invention.
Figure 2:
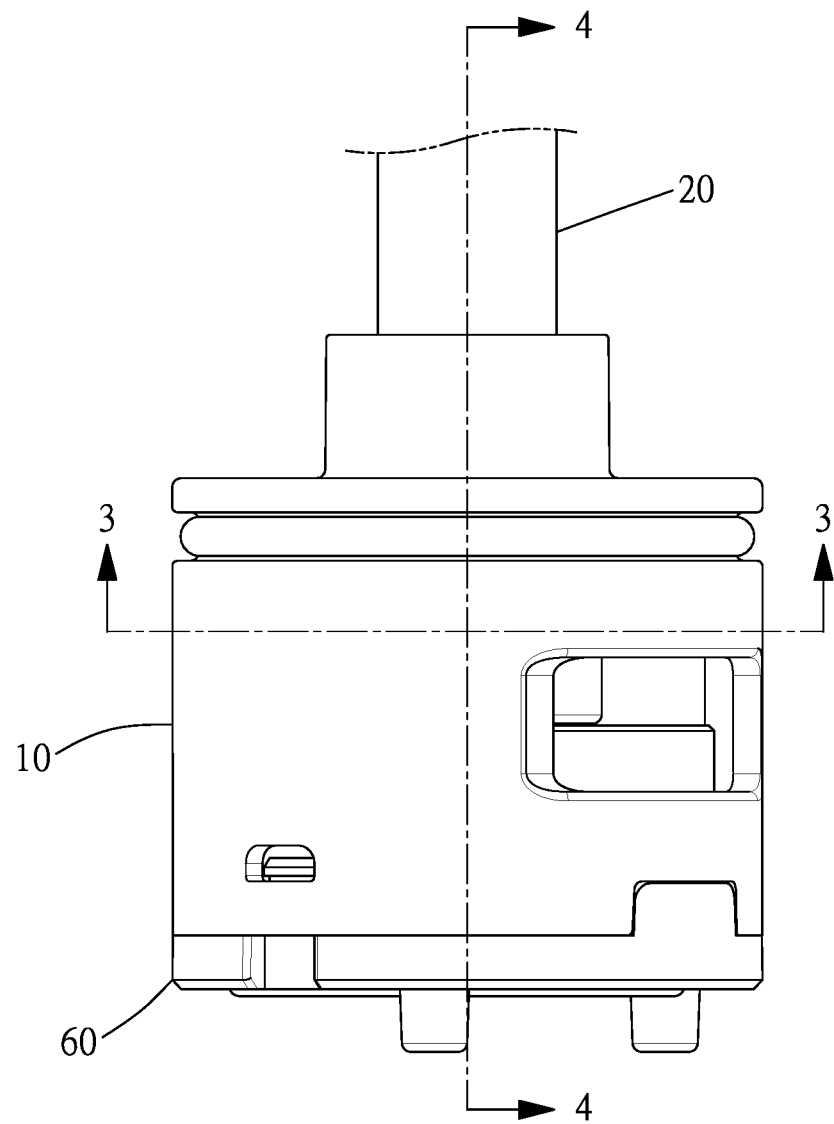
FIG. 2 is a front view of Embodiment 1 of the invention.
Figure 3:
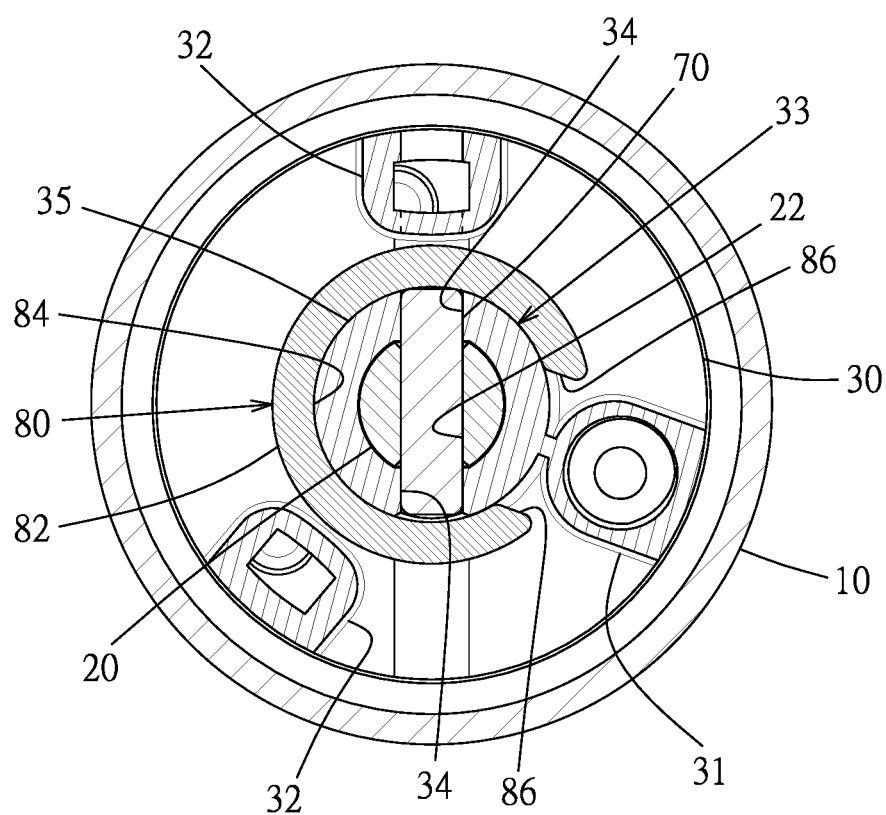
FIG. 3 is 3-3 sectional view of FIG. 2.
Figure 4:
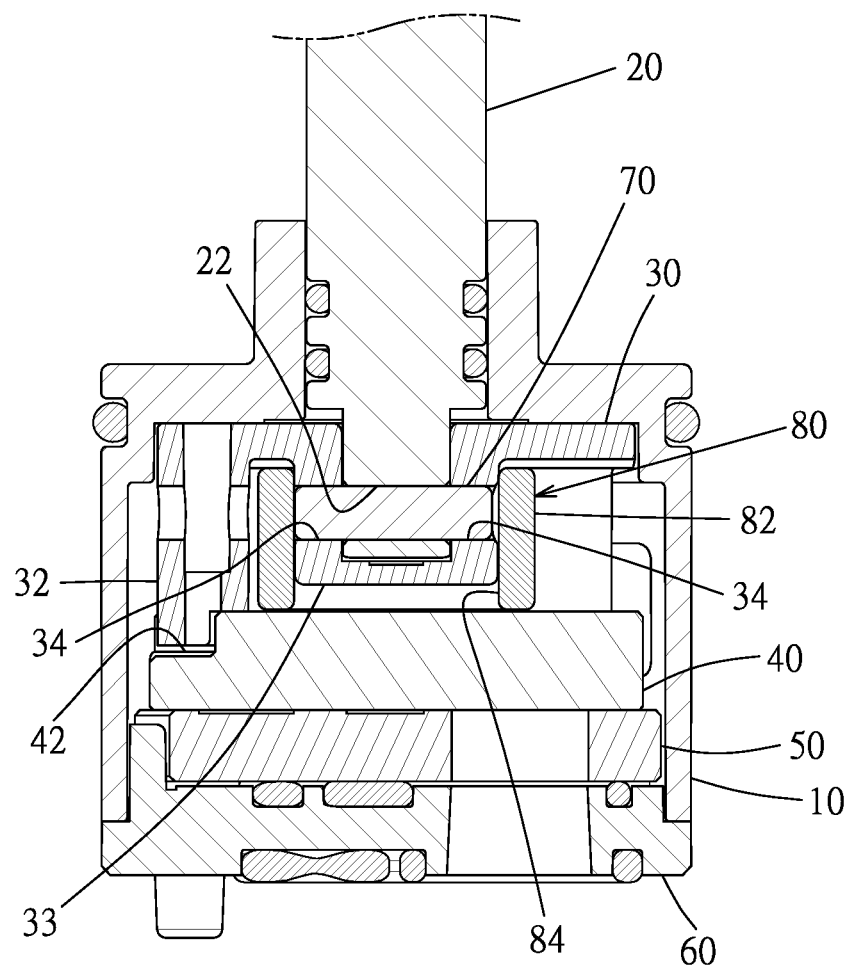
FIG. 4 is 4-4 sectional view of FIG. 2.

Depicted in FIGS. 1 to 5 are embodiments of the valve core with bolt-connected valve stem and drive piece. However, such embodiments are for illustrative purpose only and are not intending to limit the scope of the invention in application.

Referring to FIGS. 1 to 4, Embodiment 1 of the valve core with bolt-connected valve stem and drive piece comprises a valve shell 10, a valve stem 20, a drive piece 30, a dynamic valve plate 40, a static valve plate 50 and a valve seat 60.

The valve shell 10 is a hollow shell structure. The drive piece 30, the dynamic valve plate 40, and the static valve plate 50 are sequentially configured inside the valve shell 10 along the axial direction. The valve seat 60 is connected to the valve shell 10. The static valve plate 50 is connected to the valve seat 60. The dynamic valve plate 40 and the static valve plate 50 are respectively plates made of a ceramic material. The dynamic valve plate 40 and the static valve plate 50 are tightly overlapped. The dynamic valve plate 40 is located between the drive piece 30 and the static valve plate 50. The drive piece 30 is configured with a first convex part 31 and two second convex parts 32. The side of the dynamic valve plate 40 facing the drive piece 30 is formed with three notches 42. The first convex part 31 and the second convex parts 32 are respectively embedded into each of the notches 42. The drive piece 30 drives the dynamic valve plate 40 to rotate through the first convex part 31 and the second convex parts 32.

The number of the second convex parts 32 can be increased or decreased as needed. The number of the notches 42 matches the total number of the first convex part 31 and the second convex part 32 and is increased or decreased accordingly.

The drive piece 30 is protruded with a hollow convex cap 33 in the direction facing the dynamic valve plate 40. The valve stem 20 goes through the axle center of the drive piece 30 in the axial direction. One end of the valve stem 20 extends into the convex cap 33, and the other end of the valve stem 20 extends out of the valve shell 10 in the direction away from the valve seat 60. The valve stem 20 is radially configured with a first bolt hole 22. The convex cap 33 is radially configured with two second bolt holes 34. The first bolt hole 22 and each of the second bolt holes 34 are sequentially configured along the axial direction and are communicated to each other. A bolt piece 70 goes through the first bolt hole 22 and each of the second bolt holes 34 along the axial direction, so that the valve stem 20 and the drive piece 30 are bolt-connected, and the valve stem 20 can drive the drive piece 30 to rotate through the bolt piece 70.

A sealing piece 80 is covered by the convex cap 33, and the sealing piece 80 blocks the end of each of the second bolt holes 34 away from the valve stem 20, thus sealing the bolt piece 70.

The sealing piece 80 blocks the bolt piece 70 in the axial direction of the bolt piece 70, and the bolt piece 70 is limited by the sealing piece 80 within the range of the first bolt hole 22 and the second bolt hole 34. The bolt piece 70 will not contact the valve shell 10, and will not cause frictional noise and affect the strength and life cycle of the valve shell 10, as is the case in the prior art. When the valve stem 20 drives the drive piece 30 to rotate, the axial direction of the bolt piece 70 and the direction of the gravity will have oblique crossing or overlap, and the gravity will not cause the bolt piece 70 to slide and fall apart from the first bolt hole 22 and the second bolt holes 34. Thus, the relative structural form of the valve stem 20 and the drive piece 30 connected by the bolt piece 70 is maintained to facilitate arrangement of a water tap, a control valve, or any other fluid control device disclosed in Embodiment 1.

The sealing piece 80 is an arched structure. The outer edge of the sealing piece 80 in the radial direction is formed with an outer edge surface 82, and the inner edge of the sealing piece 80 in the radial direction is formed with an inner edge surface 84. The sealing piece 80 has two end surfaces 86. Each of the end surfaces 86 is located on the two ends of the sealing piece 80 in the peripheral direction. Each of the end surfaces 86 is respectively connected to the outer edge surface 82 and the inner edge surface 84. The end surfaces 86 are opposite each other along the peripheral direction of the sealing piece 80. The first convex part 31 extends into the space between the end surfaces 86. The first convex part 31 limits the rotational angular range of the sealing piece 80 in relation to the convex cap 33. Thus, when the gravity or the acting force from the fluid disclosed in Embodiment 1 causes the sealing piece 80 to rotate around the convex cap 33, the sealing piece 80 can only rotate back and forth within a small angular range, and the space between the end surfaces 86 will not coincide with the axial extension of the bolt piece 70, and the sealing piece 80 will constantly block the sealing piece 80.

Specifically, the radial periphery of the convex cap 33 is formed with a ring surface 35. The ring surface 35 and the inner edge surface 84 are opposite each other along the radial direction of the sealing piece 80. The inner diameter of the ring surface 35 and the outer diameter of the inner edge surface 84 match each other. The matching relationship comprises a tight matching between the size allowances of the inner diameter of the ring surface 35 and the outer diameter of the inner edge surface 84, and also a loose matching between the size allowances of the inner diameter of the ring surface 35 and the outer diameter of the inner edge surface 84.

Figure 5:
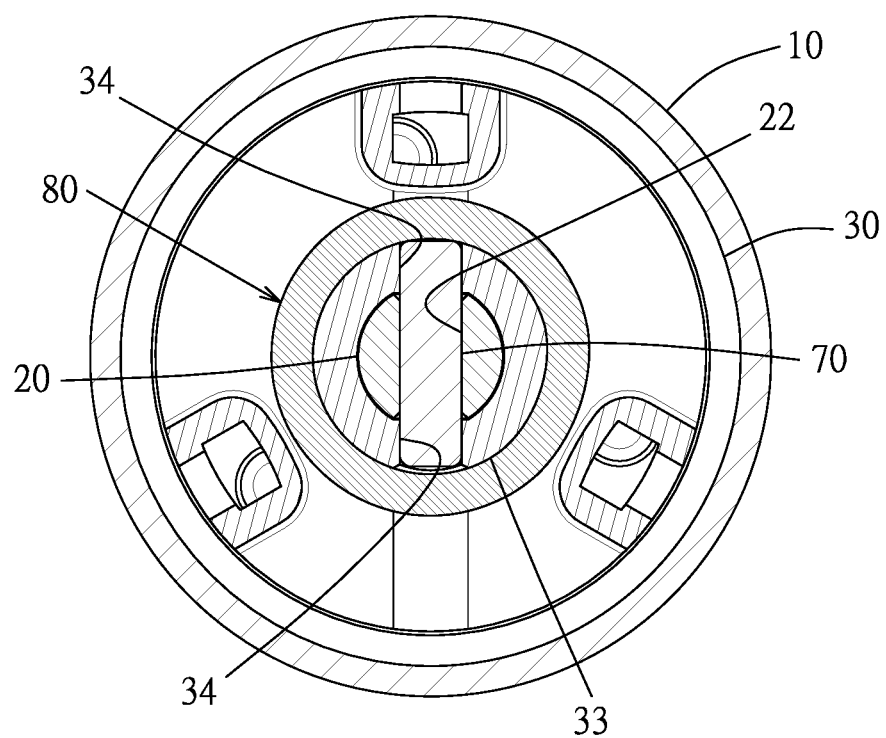
FIG. 5 is a sectional view of Embodiment 2 of the invention in the radial direction, showing the connection between the drive piece and the valve stem.

Referring to FIG. 5, the structure of Embodiment 2 differs from Embodiment 1 mainly in that the sealing piece 80 is a sealed ring structure.

I claim:

1. A valve core with bolt-connected valve stem and drive piece, comprising a valve shell, a valve stem, a drive piece, a dynamic valve plate, a static valve plate and a valve seat, wherein the valve shell is a hollow shell structure, the drive piece, the dynamic valve plate, and the static valve plate are sequentially configured inside the valve shell, the valve seat is connected to the valve shell, the static valve plate is connected to the valve seat, the dynamic valve plate and the static valve plate are respectively plates made of a ceramic material, the dynamic valve plate and the static valve plate are tightly overlapped, the dynamic valve plate is located between the drive piece and the static valve plate, the drive piece is configured with a first convex part and a second convex part along the axial direction, the side of the dynamic valve plate facing the drive piece is formed with two notches, the first convex part and the second convex part are respectively embedded into each of the notches, the drive piece is protruded with a hollow convex cap in the direction facing the dynamic valve plate, the valve stem goes through the axle center of the drive piece along the axial direction, one end of the valve stem extends into the convex cap, the other end of the valve stem extends out of the valve shell in the direction away from the valve seat, a first bolt hole goes through the valve stem along the radial direction, the convex cap is formed with two second bolt holes along the axial direction, the first bolt hole and the second bolt holes are sequentially configured along the axial direction and are communicated to each other, a bolt piece goes through the first bolt hole and each of the second bolt holes along the radial direction, so that the valve stem and the drive piece are bolt connected;

a sealing piece is covered by the convex cap, and the sealing piece blocks the end of each second bolt hole away from the valve stem, so as to seal the bolt piece.

2. The valve core with bolt-connected valve stem and drive piece defined in claim 1, wherein the sealing piece is an arched structure, the radial outer edge of the sealing piece is formed with an outer edge surface, the radial inner edge of the sealing piece is formed with an inner edge surface, the sealing piece has two end surfaces, each end surface is respectively connected to the outer edge surface and the inner edge surface, the end surfaces are opposite each other along the peripheral direction of the sealing piece, the first convex part extends into the space between the two end surfaces, the first convex part limits the angular range of the rotation of the sealing piece in relation to the convex cap.

3. The valve core with bolt-connected valve stem and drive piece defined in claim 2, wherein the radial periphery of the convex cap is formed with a ring surface, the ring surface and the inner edge surface are opposite each other along the radial direction of the sealing piece, the inner diameter of the ring surface and the outer diameter of the inner edge surface are in a matching relationship.

4. The valve core with bolt-connected valve stem and drive piece defined in claim 1, wherein the sealing piece is a sealed ring structure.

\* \* \* \* \*